United States Patent
Lu et al.

(10) Patent No.: US 9,462,491 B2
(45) Date of Patent: Oct. 4, 2016

(54) METHOD AND DEVICE FOR PROCESSING STANDARD VERSION MODE OF BASE STATION, TERMINAL AND BASE STATION

(75) Inventors: Zhaohua Lu, Shenzhen (CN); Xiaodan Zhang, Shenzhen (CN); Kun Liu, Shenzhen (CN)

(73) Assignee: ZTE CORPORATION (CN)

( * ) Notice: Subject to any disclaimer, the term of this patent is extended or adjusted under 35 U.S.C. 154(b) by 16 days.

(21) Appl. No.: 14/398,543

(22) PCT Filed: Jun. 21, 2012

(86) PCT No.: PCT/CN2012/077322
§ 371 (c)(1),
(2), (4) Date: Nov. 3, 2014

(87) PCT Pub. No.: WO2013/163841
PCT Pub. Date: Nov. 7, 2013

(65) Prior Publication Data
US 2015/0131549 A1 May 14, 2015

(30) Foreign Application Priority Data

May 4, 2012 (CN) .......................... 2012 1 0136644

(51) Int. Cl.
*H04W 4/00* (2009.01)
*H04W 24/02* (2009.01)
(Continued)

(52) U.S. Cl.
CPC ............. *H04W 24/02* (2013.01); *H04W 88/08* (2013.01); *H04W 88/10* (2013.01)

(58) Field of Classification Search
CPC ............................ H04W 20/02; H04W 88/08
USPC ............................ 370/328–339; 709/201–217
See application file for complete search history.

(56) References Cited

U.S. PATENT DOCUMENTS

2007/0104218 A1    5/2007  Hassan et al.
2007/0211655 A1*   9/2007  Lin ..................... H04W 52/028
                                                              370/318
(Continued)

FOREIGN PATENT DOCUMENTS

CN          102098768           6/2011
CN          102291772           12/2011
(Continued)

OTHER PUBLICATIONS

International Search Report for International Patent Application No. PCT/CN2012/077322, mailed Feb. 7, 2013.
(Continued)

*Primary Examiner* — Iqbal Zaidi
(74) *Attorney, Agent, or Firm* — McAndrews, Held & Malloy, Ltd.

(57) ABSTRACT

Provided are a method and device for processing a standard version mode of a base station, a terminal and a base station. A base station working in a first standard version mode judges whether a working mode of the base station needs to be adjusted, the first standard version mode is a mode of providing services for a first standard version terminal at least supporting a first standard version. If a judging result is yes, the base station adjusts the first standard version mode to another standard version mode, wherein said another standard version mode is a mode of providing services for other standard version terminals at least supporting another standard version other than the first standard version. Through the solutions, the problem that the system spectrum efficiency is hard to improve effectively and the networking flexibility is low due to the excessive emphasis on backward compatibility can be solved.

17 Claims, 6 Drawing Sheets

(51) Int. Cl.
*H04W 88/10* (2009.01)
*H04W 88/08* (2009.01)

(56) References Cited

U.S. PATENT DOCUMENTS

2008/0186910 A1 8/2008 Cho et al.
2010/0272016 A1* 10/2010 Ko ..................... H04W 76/022
370/328
2011/0250913 A1* 10/2011 Vajapeyam ....... H04W 74/0833
455/507

FOREIGN PATENT DOCUMENTS

EP 2164288 A2 3/2010
EP 2164288 A3 5/2011
WO 2012148542 A1 11/2012

OTHER PUBLICATIONS

Communication with European Search Report dated May 21, 2015 corresponding to European Application No. EP 12876024.6.

* cited by examiner

METHOD AND DEVICE FOR PROCESSING
STANDARD VERSION MODE OF BASE
STATION, TERMINAL AND BASE STATION

CROSS-REFERENCE TO RELATED
APPLICATIONS/INCORPORATION BY
REFERENCE

This application is a 371 of International Patent Application No. PCT/CN2012/077322, filed Jun. 21, 2012, which claims priority to Chinese Patent Application No. 201210136644.4, filed May 4, 2012, entitled "Method and Device for Processing Standard Version Mode of Base Station, Terminal and Base Station". The above-identified applications are hereby incorporated herein by reference in their entirety.

TECHNICAL FIELD

The disclosure relates to the field of communications, and in particular to a method and a device for processing a standard version mode of a base station, a terminal and a base station.

BACKGROUND

With the development of mobile Internet and the popularity of smart phones, the demand for mobile data traffic is growing fast. The fast-growing data service poses a tough challenge to the transmission capacity of the mobile communication network. According to the predication made by authority organizations, in the future ten years, the mobile data service will be doubled every year, increased one thousand times over ten years. This requires further increasing the network capacity of the operators to meet the market development request.

Statistics show that most of the mobile data service mainly occurs in indoor and hotspot environments, representing nomadic/local wireless access scenarios. According to the statistics, nearly 70% of the mobile data services occur indoors, and this ratio will also continue to grow. It is expected that it will exceed 80% over the next year. The data service is mainly Internet service, so the requirement for the quality of service is single, and far below the requirement of traditional telecommunication service for the quality of service.

The cellular mobile communication system is mainly designed for traditional mobile and seamlessly switching telecommunication service, which has low spectrum efficiency and high cost when bearing large flow rate and low speed Internet Protocol (IP) packet service.

By taking the Third Generation Partnership Project (3GPP) standardization organizations as an example, the Long Term Evolution (LTE) series standards (R8, R9, R10, R11, where R represents version) regulated thereby have attracted attention of many operators. One common feature of these versions is to give full considerations to the backward compatibility, so that the terminal of low level standard version (for example the terminal implemented based on LTE R8 standard version) can obtain services from the system of high level standard version (for example, the system based on LTE R11 standard version) to fully protect the interests of the users. It can be seen that the current LTE series standards are large and comprehensive technical specifications without providing special enhancement with respect to nomadic and indoor wireless access.

In order to adapt to the market development trend, the cellular mobile communication field requires a solution which is low cost and suitable for nomadic/local wireless data access. The main technical measures include spreading spectrum resources, improving spectrum efficiency, increasing cell density or the like. If the backward compatibility is overemphasized in a new solution of nomadic/local wireless data access as before, on the one hand, the terminal also has to implement the LTE series standards, which increases the implementation complexity of the terminal, and on the other hand, the base station need to work in a way which is compatible with the access of a terminal of low level standard version regardless of whether there is a low level terminal under the base station, which causes inflexible standard version mode of the base station. In addition, given that the heterogeneous network (for example, the network constituted by a macro base station, a micro base station, a Picocell, a femtocell, and a relay station) is important means for meeting the future capacity requirements, if the standard version mode of different types of base stations cannot be adjusted flexibly in the wireless network, the feeling and experience of the wireless network user will be affected.

No effective solution has been proposed for the problem that the system spectrum efficiency is hard to improve effectively and the networking flexibility is low due to the excessive emphasis on backward compatibility in the relevant technology.

SUMMARY

The disclosure provides a method and a device for processing a standard version mode of a base station, a terminal and a base station, to at least solve the problem that the system spectrum efficiency is hard to improve effectively and the networking flexibility is low due to the excessive emphasis on backward compatibility in the relevant technology.

According to an embodiment of the disclosure, there is provided a method for processing a standard version mode of a base station, including: a base station working in a first standard version mode judging whether a working mode of the base station needs to be adjusted, wherein the first standard version mode is a mode of providing services for a first standard version terminal at least supporting a first standard version; if a judging result is that the working mode of the base station needs to be adjusted, the base station adjusting the first standard version mode to another standard version mode, wherein said another standard version mode is a mode of providing services for other standard version terminals at least supporting another standard version other than the first standard version.

In the described embodiment, said another standard version mode includes at least one of:
a second standard version mode, which is a mode of providing services for a second standard version terminal at least supporting a second standard version; and
a third standard version mode, which is a mode of providing services for the first standard version terminal and the second standard version terminal.

In the described embodiment, the base station judging whether the working mode of the base station needs to be adjusted includes:
the base station receiving network information provided by each communication node of a communication system, and judging whether the working mode of the base station needs to be adjusted according to the network information; or the base station judging whether the working mode of the base station needs to be adjusted according to conditions of the base station.

In the described embodiment, the network information includes at least one of:

channel quality information of the first standard version terminal, wherein the channel quality information is obtained through scanning, by the base station, a physical signal sent by the first standard version terminal;

channel quality information of the second standard version terminal, wherein the channel quality information is obtained through scanning, by the base station, a physical signal sent by the second standard version terminal;

equipment information about whether there exists the second standard version terminal within a coverage area of the base station;

indication information notifying the base station to adjust to the second standard version mode or the third standard version mode; and information notifying the base station of a cycle that the base station works in the first standard version mode and in the second standard version mode.

In the described embodiment, the channel quality information of the first standard version terminal includes that: a carrier frequency used for sending the physical signal by the first standard version terminal is different from a working carrier frequency of the base station; or the carrier frequency used for sending the physical signal by the first standard version terminal is the same as the working carrier frequency of the base station; and the channel quality information of the second standard version terminal includes that: a carrier frequency used, for sending the physical signal by the second standard version terminal is different from a working carrier frequency of the base station; or the carrier frequency used for sending the physical signal by the second standard version terminal is the same as the working carrier frequency of the base station.

In the described embodiment, the equipment information includes at least one of:

information of the number of second standard version terminals at least contained within the coverage area of the base station; and the second standard version terminal being a terminal meeting a specific user class.

In the described embodiment, the base station judging whether the working mode of the base station needs to be adjusted according to the network information includes: the base station judging that the working mode of the base station needs to be adjusted when determining according to the network information that there exists a second standard version terminal within the coverage area; and the base station adjusting the first standard version mode to another standard version mode includes: the base station adjusting the first standard version mode to the second standard version mode or the third standard version mode.

In the described embodiment, the second standard version terminal is a second standard version terminal meeting a specific user class.

In the described embodiment, before the base station adjusts the first standard version mode to the second standard version mode, the method further includes: the base station sending inhibit information that the terminal access is inhibited.

In the described embodiment, after the base station sends the inhibit information that the terminal access is inhibited, the method further includes: a terminal which receives the inhibit information selecting a serving base station from other base stations other than the base station.

In the described embodiment, before the base station adjusts the first standard version mode to the second standard version mode or the third standard version mode, the method further includes: the base station sending adjustment information indicating that the base station is about to work in the second standard version mode or in the third standard version mode.

In the described embodiment, the adjustment information includes time information that the base station works in the second standard version mode or in the third standard version mode.

In the described embodiment, after the base station sends the adjustment information, the method further includes:

the terminal which receives the adjustment information judging whether the base station has worked in the second standard version mode or in the third standard version mode; and when the judging result is that the base station has worked in the second standard version mode or in the third standard version mode, the terminal which receives the adjustment information attempting to access the base station.

In the described embodiment, after the base station sends the adjustment information, the method further includes:

the base station judging whether the base station has adjusted the working mode of the base station to the second standard version mode or the third standard version mode; and when the judging result is that the base station has adjusted the working mode of the base station to the second standard version mode or the third standard version mode, the base station sending working information that the base station works in the second standard version mode or in the third standard version mode.

In the described embodiment, the working information is sent in any of the following ways:

the base station sending the working information on a synchronous channel by selecting a synchronous sequence having a mapping relationship with the working information; and the base station sending the working information through a control signalling.

In the described embodiment, when the base station is adjusted to the second standard version mode, the base station provides services for a terminal under the base station and supporting both the first standard version and the second standard version.

In the described embodiment, before the base station adjusts the first standard version mode to the second standard version mode, the method further includes: the base station notifying the first standard version terminal under the base station to switch to other base stations.

According to another embodiment of the disclosure, provided is a method for processing a standard version mode of a base station, including: a terminal receiving standard version mode information sent by a base station, wherein the base station is able to adjust the standard version mode information according to a standard version mode in which the base station works currently; and the terminal determining a subsequent working behaviour according to the standard version mode information.

In the described embodiment, the standard version mode information is sent in any of the following ways:

the base station sending the standard version mode information on a synchronous channel by selecting a synchronous sequence having a mapping relationship with the standard version mode information; and the base station sending the standard version mode information through a control signalling.

In the described embodiment, the control signalling includes a media access control message or a control signalling transmitted on a physical broadcast channel.

In the described embodiment, the terminal determining the subsequent working behaviour according to the standard version mode information includes at least one of the following:

the terminal determining a method of acquiring channel information of the terminal according to the standard version mode information;

the terminal determining an available downlink resource for sending service data according to the standard version mode information; and the terminal determining a method of acquiring physical downlink control information according to the standard version mode information.

According to still another embodiment of the disclosure, provided is a device for processing a standard version mode of a base station, a judgment component, configured to judge whether a working mode of the base station working in a first standard version mode needs to be adjusted, wherein the first standard version mode is a mode of providing services for a first standard version terminal at least supporting a first standard version; an adjustment component, configured to, if a judging result of the judgment component is that the working mode of the base station needs to be adjusted, adjust the first standard version mode to another standard version mode, wherein said another standard version mode is a mode of providing services for other standard version terminals at least supporting another standard version other than the first standard version.

In the described embodiment, said another standard version mode adjusted by the adjustment component includes at least one of:

a second standard version mode, which is a mode of providing services for a second standard version terminal at least supporting a second standard version; and a third standard version mode, which is a mode of providing services for the first standard version terminal and the second standard version terminal.

In the described embodiment, the judgment component includes a first judgment unit and/or a second judgment unit, wherein the first judgment unit is configured to receive network information provided by each communication node of a communication system, and judge whether the working mode of the base station needs to be adjusted according to the network information; and the second judgment unit is configured to judge whether the working mode of the base station needs to be adjusted according to conditions of the base station.

In the described embodiment, the first judgement unit is further configured to determine that the base station needs to adjust the working mode of the base station when determining that there exists the second standard version terminal within a coverage area of the base station according to the network information;

and the adjustment mode coupled to the first judgement unit is further configured to adjust the first standard version mode to the second standard version mode or the third standard version mode.

In the described embodiment, the device further includes:

a sending component, coupled to the judgment component and the adjustment component respectively and configured to, before the first standard version mode is adjusted to the second standard version mode, send inhibit information that the terminal access is inhibited.

In the described embodiment, the sending component is further configured to, before the first standard version mode is adjusted to the second standard version mode or the third standard version mode, send adjustment information that the base station is about to work in the second standard version mode or in the third standard version mode.

In the described embodiment, the judgment component is further configured to judge whether the base station has adjusted the working mode of the base station to the second standard version mode or the third standard version mode; and the sending component is further configured to, when the judging result is that the base station has adjusted the working mode of the base station to the second standard version mode or the third standard version mode, send the working information that the base station works in the second standard version mode or in the third standard version mode.

In the described embodiment, the device further includes:

a notification component, coupled to the judgment component and the adjustment component respectively and configured to, before the first standard version mode is adjusted to the second standard version mode, notify the first standard version terminal under the base station to switch to other base stations.

According to still another embodiment of the disclosure, provided is a base station, including the device for processing the standard version mode of the base station in the above embodiment.

According to still another embodiment of the disclosure, provided is a device for processing a standard version mode of a base station, including: a receiving component, configured to receive standard version mode information sent by a base station, wherein the base station is able to adjust the standard version mode information according to a standard version mode in which the base station works currently; and a determining component, coupled to the receiving component and configured to determine a subsequent working behaviour according to the standard version mode information.

In the described embodiment, the standard version mode information received by the receiving component is sent in any of the following ways:

the base station sending the standard version mode information on a synchronous channel by selecting a synchronous sequence having a mapping relationship with the standard version mode information; and the base station sending the standard version mode information through a control signalling.

In the described embodiment, the determining component includes at least one of a first determining unit, a second determining unit and a third determining unit, wherein the first determining unit is configured to determine a device of acquiring channel information of the device for processing the standard version mode of the base station according to the standard version mode information;

the second determining unit is configured to determine an available downlink resource for sending service data according to the standard version mode information; and the third determining unit is configured to determine a device of acquiring physical downlink control information according to the standard version mode information.

According to still another embodiment of the disclosure, provided is a terminal, including the device for processing the standard version mode of the base station mentioned above.

In the embodiments of the disclosure, the base station working in the first standard version mode judges whether a working mode of the base station needs to be adjusted. If the judging result is that the working mode of the base station needs to be adjusted, the base station adjusts the first standard version mode to another standard version mode. It can be seen that the base station of the embodiments of the disclosure can adjust different types of standard version modes flexibly without adding a new version mode and without improving the terminal side, which reduces the implementation complexity of the terminal, improves the networking flexibility, improves the system spectrum efficiency effectively and feeling and experience of the user, thereby better meeting the demands of data users developing with high speed and the future development of the wireless communication industry.

BRIEF DESCRIPTION OF THE DRAWINGS

The accompanying drawings described herein serve to provide a further understanding of the disclosure, and constitute a part of this application. The schematic embodiments of the disclosure and description thereof serve to explain the disclosure rather than to limit the disclosure inappropriately. In the drawings.

DETAILED DESCRIPTION OF THE EMBODIMENTS

Hereinafter, the disclosure will be described in detail in conjunction with the embodiments with reference to the accompanying drawings. It should be noted that the embodiments of the application and the features of the embodiments can be combined with each other without any conflict.

As mentioned in the relevant technology, if the backward compatibility is overemphasized in a new solution of nomadic/local wireless data access as before, on the one hand, the terminal also has to implement the LTE series standards, which increases the implementation complexity of the terminal; and on the other hand, the base station has to work in a way which is compatible with the access of the terminal of low level standard version regardless of whether there is a low level terminal under the base station, which causes inflexible standard version mode of the base station. In addition, given that the heterogeneous network (for example, the network constituted by a macro base station, a micro base station, a Picocell, a femtocell, and a relay station) is important means for meeting the future capacity requirements, if the standard version mode of different types of base stations is unable to be adjusted flexibly in the wireless network, the feeling and experience of the wireless network user will be affected.

Figure 1:
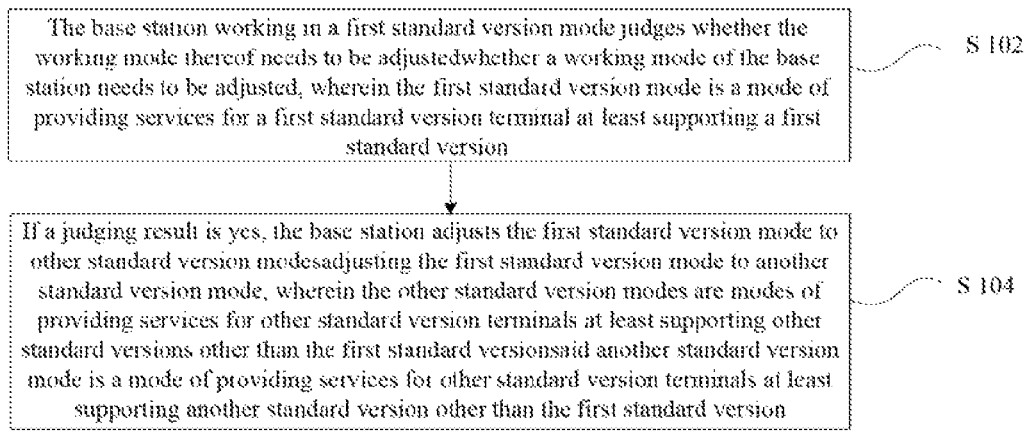
FIG. 1 is a processing flowchart of a method for processing a standard version mode of a base station according to an embodiment of the disclosure.

In order to solve the above technical problem, an embodiment of the disclosure provides a method for processing a standard version mode of a base station, to better meet the demands of data users developing with high speed and the future development of the wireless communication industry. A processing flowchart of the method is as shown in FIG. 1 specifically, the method includes the following steps.

Step S102: A base station working in a first standard version mode judges whether a working mode of the base station needs to be adjusted, wherein the first standard version mode is a mode of providing services for a first standard version terminal at least supporting a first standard version.

Step S104: If a judging result is that the working mode of the base station needs to be adjusted, the base station adjusts the first standard version mode to another standard version mode, wherein said another standard version mode is a mode of providing services for other standard version terminals at least supporting another standard version other than the first standard version.

In the embodiment of the disclosure, the base station working in the first standard version mode judges whether a working mode of the base station needs to be adjusted. If the judging result is yes, the base station adjusts the first standard version mode to another standard version mode. It can be seen that the base station of the embodiments of the disclosure can adjust different types of standard version modes flexibly without adding a new version mode and without improving the terminal side, which reduces the implementation complexity of the terminal, improves the networking flexibility, improves the system spectrum efficiency effectively and feeling and experience of the user, thereby better meeting the demands of data users developing with high speed and the future development of the wireless communication industry.

The above another standard version mode mentioned in Step S104 may be any version mode other than the first standard version mode. For example, the above another standard version mode may be a second standard version mode incompatible with the first standard version mode, and may also be a third standard version mode compatible with the first standard version mode and the second standard version mode, even may be a fourth standard version mode, a fifth standard version mode and so on. The numbers herein are only used for representing different standard version modes, and the specific version of the standard is not limited. For example, the first standard version may be an LTE R8, and may also be an LTE R9 or the like. Corresponding to each version, the second standard version mode is a mode of providing services for a second standard version terminal at least supporting a second standard version, and the third standard version mode is a mode of providing services for the first standard version terminal and the second standard version terminal.

In the process as shown in FIG. 1, when Step S102 is implemented, the base station needs to judge whether a working mode of the base station needs to be adjusted. There are generally two types of judgmental processes, i.e., a passive judgment process and an active judgment process. The passive judgment process means that the base station makes a judgment according to non-self information, for example the base station receives network information provided by each communication node of a communication system, and judges whether a working mode of the base station needs to be adjusted according to the network information. The information that the passive judgment process can use is not limited to the network information provided herein, and may be the network environments where the base station is located, flow interaction between the base station and other network elements or the like. The active judgment process means that the base station judges whether the working mode is adjusted according to conditions or information of the base station itself, for example, the version of hardware or software adopted by the base station or the like.

The network information mentioned in the passive judgment process is illustrated with an example. In the example, the network information includes at least one of:

channel quality information of the first standard version terminal, wherein the channel quality information is obtained through scanning, by the base station, a physical signal sent by the first standard version terminal;

channel quality information of the second standard version terminal, wherein the channel quality information is obtained through scanning, by the base station, a physical signal sent by the second standard version terminal;

equipment information about whether there exists the second standard version terminal within a coverage area of the base station;

indication information notifying the base station to adjust to the second standard version mode or the third standard version mode; and information notifying the base station of a cycle that the base station works in the first standard version mode and in the second standard version mode.

Each element above is only an example embodiment. During specific implementation, elements are not limited to the above information; as long as an element can be used by the base station to judge that the information about whether the working mode needs to be adjusted, this element could serve as the network information.

Among these, in an example embodiment, the channel quality information of the first standard version terminal may include the following two situations: a carrier frequency used for sending the physical signal by the first standard version terminal is different from a working carrier frequency of the base station; or the carrier frequency used for sending the physical signal by the first standard version terminal is the same as the working carrier frequency of the base station.

Similarly, the channel quality information of the second standard version terminal may include the following two situations: a carrier frequency used for sending the physical signal by the second standard version terminal is different from a working carrier frequency of the base station; or the carrier frequency used for sending the physical signal by the second standard version terminal is the same as the working carrier frequency of the base station.

The network information mentioned above includes equipment information about whether there exists a second standard version terminal within the coverage area of the base station. The equipment information may be any information of the second standard version terminal. In an example embodiment, the equipment information may include at least one of: information of the number of second standard version terminals at least contained within the coverage area of the base station; and the second standard version terminal being a terminal meeting a specific user class.

If the base station can determine that the second standard version terminal exists within the coverage area thereof according to the network information mentioned above, the base station needs to adjust the working mode thereof and adjusts the first standard version mode to another standard version mode suitable for the second standard version terminal. For example, the base station may adjust the first standard version mode to the second standard version made or the third standard version mode. In an example embodiment, the second standard version terminal may be the second standard version terminal meeting the specific user class, for example a VIP user specified by the operator.

In one example embodiment, in order to avoid a case where the base station adjusts the working mode when the first standard version terminal just accesses the base station and the base station working in the adjusted standard version mode is unable to provide services for the terminal, the base station may select to send inhibit information that the terminal access is inhibited before adjusting the first standard version mode to the second standard version mode. If the terminal side receives the inhibit information, the terminal may not access the base station according to the inhibit information, and selects a serving base station from other base stations other than the base station to access. By using the method, the case that the terminal accesses a base station unable to provide services for itself is avoided, and the network resources are saved.

For a first standard version terminal having accessed the base station, if the base station is adjusted to the second standard version mode, the base station would not be able to provide services for the accessed first standard version terminal. Therefore, before the base station adjusts the first standard version mode to the second standard version mode, the base station notifies the first standard version terminal under the base station to switch to other base stations. The terminal side initiates a switching process after receiving the notification.

In order to make the terminal aware of the status of the base station, for example, whether the base station will adjust its working mode, and to which working mode the base station will adjust or the like, before the base station adjusts the first standard version mode to the second standard version mode or the third standard version mode, the base station sends adjustment information indicating that the base station is about to work in the second standard version mode or in the third standard version mode. Among these, in an example embodiment, the adjustment information includes time information that the base station works in the second standard version mode or in the third standard version mode, for example, the start time and stop time when the base station works in the second standard version mode, or the start time and stop time when the base station works in the third standard version mode, or the like.

Corresponding to the adjustment information sent by the base station, on the terminal side, the terminal receiving the adjustment information may judge whether the base station has worked in the second standard version mode or in the third standard version mode according to the time information. When the judging result is yes, the terminal receiving the adjustment information attempts to access the base station. When the judging result is no, the terminal continues to wait, and does not attempt to access the base station. This ensures that the terminal can avoid attempting to access the base station unable to provide services for this terminal repeatedly, and avoid network congestion and waste of network resources due to ineffective attempt.

Based on the same purpose, after the base station sends the adjustment information, the base station may judge whether the base station has adjusted the working mode of the base station to the second standard version mode or the third standard version mode. When the judging result is that the base station has adjusted the working mode of the base station to the second standard version mode or the third standard version mode, the base station sends working information that the base station works in the second standard version mode or in the third standard version mode. The terminal side acquires the working mode finally determined by the base station. If the working mode is the second standard version mode, the second standard version terminal preferably accesses the base station. If the working mode is the third standard version mode, both the first standard version terminal and the second standard version terminal may select to access the base station.

During implementation, the working information may be sent in many ways. Ira an example embodiment, the base station may send the working information on a synchronous channel by selecting a synchronous sequence having a mapping relationship with the working information. In addition, the base station may send the working information through a control signalling. During implementation, the message able to bear the working information is not limited to the control signalling or synchronous sequence, and may be any message able to carry the working information to the terminal.

When the base station is adjusted to the second standard version mode, the base station may continue to provide services for the terminal under the base station and supporting both the first standard version and the second standard version.

Figure 2:
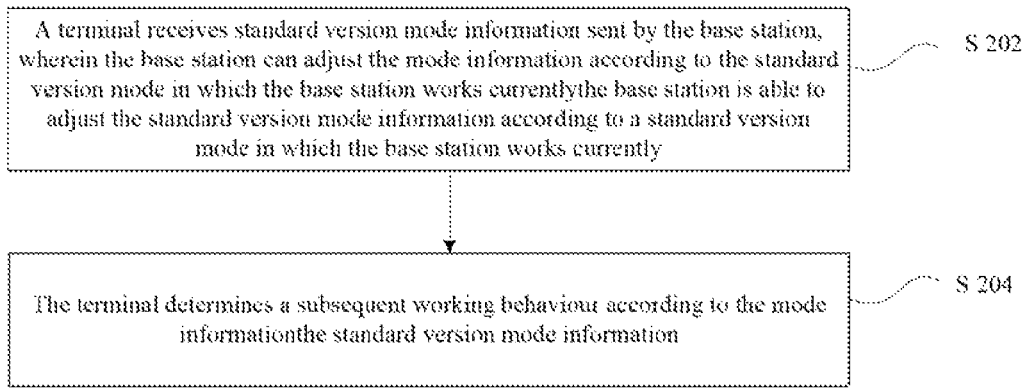
FIG. 2 is a processing flowchart of another method for processing a standard version mode of a base station according to an embodiment of the disclosure.

Based on the same inventive concept, an embodiment of the disclosure also provides another method for processing a standard version mode of a base station, the processing flowchart of which is as shown in FIG. 2, including the following steps.

Step S202: A terminal receives standard version mode information sent by the base station, wherein the base station is able to adjust the standard version mode information according to a standard version mode in which the base station works currently.

Step S204: The terminal determines a subsequent working behaviour according to the standard version mode information.

In one example embodiment, the standard version mode information mentioned in Step S202 may be sent in any of the following ways that:

the base station sends the standard version mode information on a synchronous channel by selecting a synchronous sequence having a mapping relationship with the standard version mode information; and the base station sends the standard version mode information through a control signalling.

Among these, there may be multiple types of control signalling, e.g., a media access control message or a control signalling transmitted on a physical broadcast channel.

During implementation, the message able to bear the working information is not limited to the control signalling or synchronous sequence, and may be any message able to carry the working information to the terminal.

In the process as shown in FIG. 2, the terminal determines the subsequent working behaviour according to the standard version mode information as mentioned in Step S204. There may be multiple types of subsequent working behaviours, for example, the terminal determines a method of acquiring channel information of the terminal according to the standard version mode information; or the terminal determines an available downlink resource for sending service data according to the standard version mode information; or the terminal determines a method of acquiring physical downlink control information according to the standard version mode information, or the like.

Figure 3:
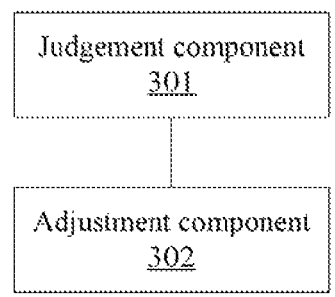
FIG. 3 is a first structure diagram of a device for processing a standard version mode of a base station according to an embodiment of the disclosure.

In order to support any example embodiment mentioned above, based on the same inventive concept, an embodiment of the disclosure also provides a device for processing a standard version mode of a base station. The device is configured in a base station working in a first standard version mode, wherein the first standard version mode is a mode of providing services for a first standard version terminal at least supporting a first standard version. The structure diagram of the device is as shown in FIG. 3, including:

a judgment component 301, configured to judge whether a working mode of the base station needs to be adjusted; and an adjustment component 302, coupled to the judgment component 301 and configured to, if a judging result is that the working mode of the base station needs to be adjusted, adjust the first standard version mode to another standard version mode, wherein said another standard version mode is a mode of providing services for other standard version terminals at least supporting another standard version other than the first standard version.

In one example embodiment, said another standard version mode adjusted by the adjustment component 302 may include at least one of: a second standard version mode, which is a mode of providing services for a second standard version terminal at least supporting a second standard version; and a third standard version mode, which is a mode of providing services for the first standard version terminal and the second standard version terminal.

Figure 3A:
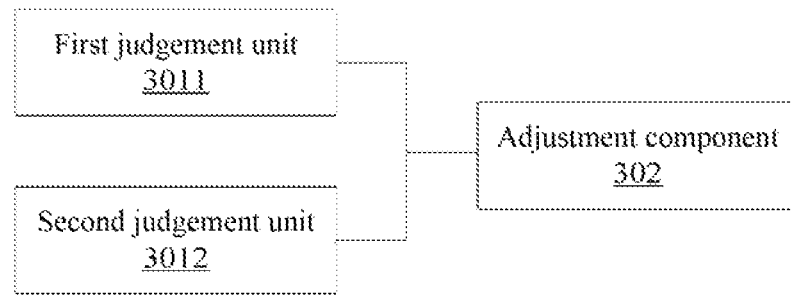
FIG. 3a is a structure diagram of a judging component according to an embodiment of the disclosure.

In one example embodiment, as shown in FIG. 3a, the judgment component 301 may include:

a first judgment unit 3011, configured to receive network information provided by each communication node of a communication system, and judge whether the working mode of the base station needs to be adjusted according to the network information; and a second judgment unit 3012, configured to judge whether the working mode of the base station needs to be adjusted according to conditions of the base station.

Among these, the first judgment unit 3011 and the second judgment unit 3012 are two parallel execution units. Different units are selected for operation according to specific situations.

In one example embodiment, the first judgement unit 3011 may further be configured to determine that the base station needs to adjust the working mode of the base station when determining that there exists the second standard version terminal within a coverage area of the base station according to the network information.

At this time, the adjustment mode 302 may further be configured to adjust the first standard version mode to the second standard version made or the third standard version mode.

Figure 3B:
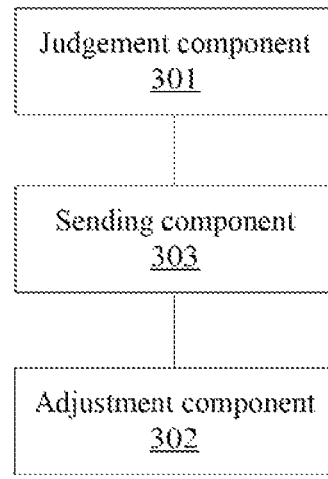
FIG. 3b is a second structure diagram of a device for processing a standard version mode of a base station according to an embodiment of the disclosure.

In one example embodiment, as shown in FIG. 3b, the device for processing the standard version mode of the base station may further include a sending component 303, one end of which is coupled to the judgment component 301 and the other end of which is coupled to the adjustment component 302, configured to, before the first standard version mode is adjusted to the second standard version mode, send inhibit information that the terminal access is inhibited.

In one example embodiment, the sending component 303 may further be configured to, before the first standard version mode is adjusted to the second standard version mode or the third standard version mode, send adjustment information that the base station is about to work in the second standard version mode or in the third standard version mode.

In one example embodiment, the judgment component 301 may further be configured to judge whether the base station has adjusted the working mode of the base station to the second standard version mode or the third standard version mode. Correspondingly, at this time, the sending component 303 may further be configured to when the judging result is that the base station has adjusted the working mode of the base station to the second standard version mode or the third standard version mode, send the working information that the base station works in the second standard version mode or in the third standard version mode.

Figure 3C:
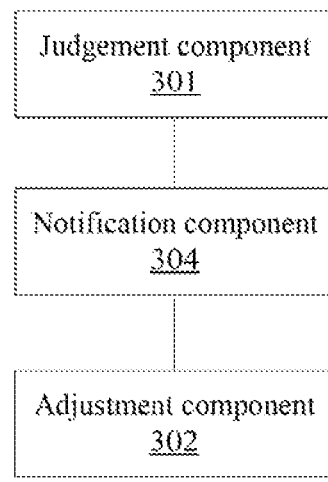
FIG. 3c is a third structure diagram of a device for processing a standard version mode of a base station according to an embodiment of the disclosure.

In one example embodiment, as shown in FIG. 3c, the device for processing the standard version mode of the base station may further include a notification component 304, one end of which is coupled to the judgment component 301 and the other end of which is coupled to the adjustment component 302, configured to, before the first standard version mode is adjusted to the second standard version mode, notify the first standard version terminal under the base station to switch to other base stations.

Figure 4:
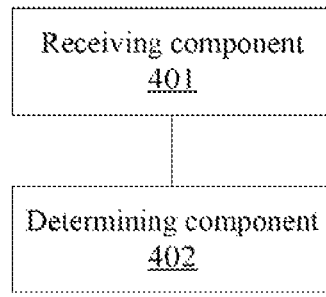
FIG. 4 is a structure diagram of another device for processing a standard version mode of a base station according to an embodiment of the disclosure.

In order to support any example embodiment mentioned above, based on the same inventive concept, an embodiment of the disclosure also provides a device for processing a standard version mode of a base station. The device is configured in a terminal. The structure diagram of the device is as shown in FIG. 4, including:

a receiving component 401, configured to receive standard version mode information sent by the base station, wherein the base station is able to adjust the standard version mode information; and a determining component 402, coupled to the receiving component 401 and configured to determine a subsequent working behaviour according to the standard version mode information.

In one example embodiment, the standard version mode information received by the receiving component 401 is sent in any of the following ways that: the base station sends the standard version mode information on a synchronous channel by selecting a synchronous sequence having a mapping relationship with the standard version mode information; and the base station sends the standard version mode information through a control signalling.

Figure 4A:
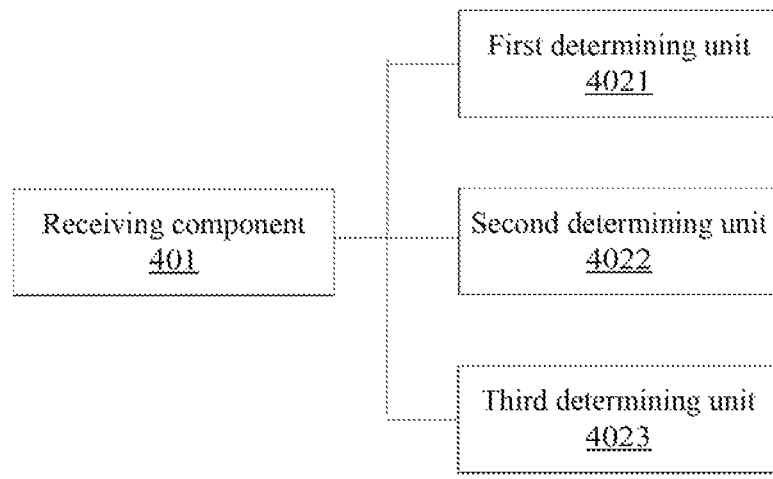
FIG. 4a is a structure diagram of a determining component according to an embodiment of the disclosure.

In one example embodiment, as shown in FIG. 4a, the determining component 402 may include:

a first determining unit 4021, configured to determine a device of acquiring channel information thereof according to the standard version mode information;

a second determining unit 4022, configured to determine an available downlink resource for sending service data according to the standard version mode information; and a third determining unit 4023, configured to determine a device of acquiring physical downlink control information according to the standard version mode information.

Among these, the first determining unit 4021, the second determining unit 4022 and the third determining unit 4023 are three parallel units. One or more specific execution units are selected according to actual situations.

Through at least one of the above technical schemes of the embodiments of the disclosure, the system spectrum efficiency may be improved effectively as well as the networking flexibility to meet the demands of future industry development.

The method for processing the standard version mode of the base station provided by the embodiment of the disclosure is now described by way of specific embodiments to be explained more clearly.

Given that the method for processing the standard version mode of the base station provided by the embodiments of the disclosure involves two sides, i.e., the base station and the terminal, the base station and the terminal are now described respectively. The method for processing the standard version mode of the base station (corresponding to FIG. 1) on the base station side is described in detail below in conjunction with Embodiment 1 to Embodiment 15.

Embodiment 1

In a communication system, the base station works in the first standard version mode, and decides whether to be adjusted to the second standard version mode or the third standard version mode according to information (i.e., network information) provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Figure 5:
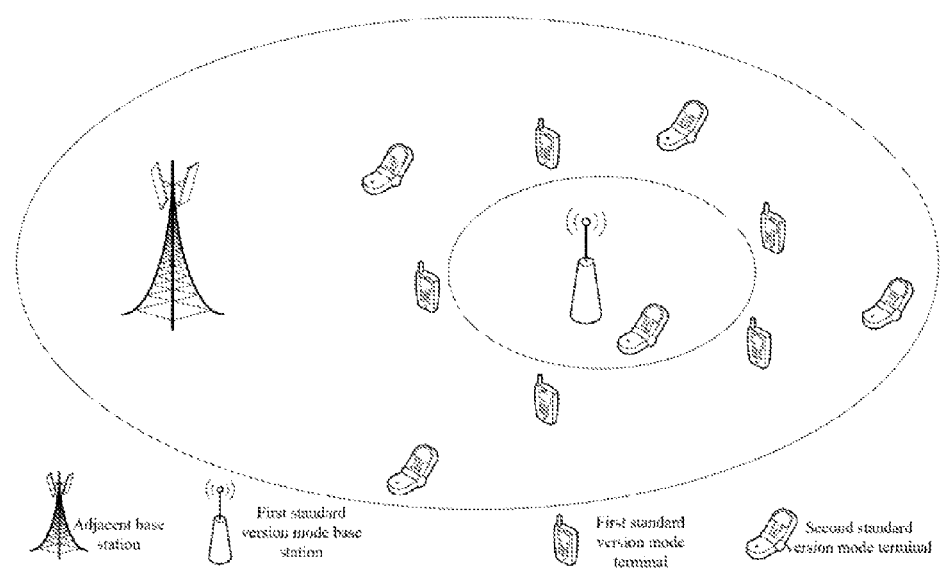
FIG. 5 is a schematic diagram of a network environment of Embodiment 1 to Embodiment 4 of the disclosure.

The base station scans an uplink signal sent by the first standard version terminal at a carrier frequency under which it works. If the quality of the received signal (for example an instantaneous value or a value processed by a filter) is lower than a threshold value meeting specific quality of service requirements (for example, signal to noise ratio or signal to interference plus noise ratio is equal to 0 dB), in the network environments as shown in FIG. 5, if the first standard version terminal does not exist within the coverage area of the base station working in the first standard version mode, the quality of the uplink signal measured at the carrier frequency under which it works and sent by the first standard version terminal is lower than the specific threshold value.

In an example embodiment, the base station scans an uplink signal sent by the second standard version terminal at a carrier frequency under which it works. If the quality of the received signal (for example an instantaneous value or a value processed by a filter) is higher than a threshold value meeting specific quality of service requirements, as shown in FIG. 5, if the second standard version terminal exists within the coverage area of the base station working in the first standard version mode, the quality of the uplink signal measured at the carrier frequency under which it works and sent by the second standard version terminal is higher than the specific threshold value, then the base station is switched to the second standard version mode or the third standard version mode.

Embodiment 2

In a communication system, the base station works in the first standard version mode, and decides whether to be adjusted to the second standard version mode or the third standard version mode according to information (i.e., network information) provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

The base station scans an uplink signal sent by the second standard version terminal at a carrier frequency under which it works. If the quality of the received signal (for example an instantaneous value or a value processed by a filter) is higher than a threshold value meeting specific quality of service requirements (for example, signal to noise ratio or signal to interference plus noise ratio is equal to 0 dB), in the network environments as shown in FIG. 5, if the second standard version terminal exists within the coverage area of the base station working in the first standard version mode, the quality of the uplink signal measured at the carrier frequency under which it works and sent by the second standard version terminal is higher than the specific threshold value, in an example embodiment, the base station scans an uplink signal sent by the first standard version terminal at a carrier frequency under which it works. If the quality of the received signal (for example an instantaneous value or a value processed by a filter) is lower than a threshold value meeting specific quality of service requirements, as shown in FIG. 5, if the first standard version terminal does not exist within the coverage area of the base station working in the first standard version mode, the quality of the uplink signal measured at the carrier frequency under which it works and sent by the first standard version terminal is lower than the specific threshold value, then the base station is switched to the second standard version mode or the third standard version mode.

Embodiment 3

In a communication system, the base station works in the first standard version mode, and decides whether to be adjusted to the second standard version mode or the third standard version mode according to information (i.e., network information) provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

The base station scans an uplink signal sent by the terminal at a carrier frequency under which the first standard version terminal works. If the quality of the received signal (for example an instantaneous value or a value processed by a filter) is lower than a threshold value meeting specific quality of service requirements (for example, signal to noise ratio or signal to interference plus noise ratio is equal to 0 dB), as shown in FIG. 5, if the first standard version terminal does not exist within the coverage area of the base station working in the first standard version mode, the quality of the uplink signal measured at the carrier frequency $f_1$ under which the first standard version terminal works (the base station works at a carrier frequency $f_2$, or the downlink of the base station works at a carrier frequency $f_2$, and the uplink thereof works at a carrier frequency $f_3$) and sent by the first standard version terminal is lower than the specific threshold value. In an example embodiment, the base station scans an uplink signal sent by the terminal at a carrier frequency under which the second standard version terminal works. If the quality of the received signal (for example an instantaneous value or a value processed by a filter) is higher than a threshold value meeting specific quality of service requirements (for example, signal to noise ratio or signal to interference plus noise ratio is equal to 0 dB), as shown in FIG. 5, if the second standard version terminal exists within the coverage area of the base station working in the first standard version mode, the quality of the uplink signal measured at the carrier frequency $f_1$ under which the second standard version terminal works (the base station works at a carrier frequency $f_2$, or the downlink of the base station works at a carrier frequency $f_2$, and the uplink thereof works at a carrier frequency $f_3$) and sent by the second standard version terminal is higher than the specific threshold value, then the base station is switched to the second standard version mode or the third standard version mode.

Embodiment 4

In a communication system, the base station works in the first standard version mode, and decides whether to be adjusted to the second standard version mode or the third standard version mode according to information provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

The base station scans an uplink signal sent by the terminal at a carrier frequency under which the second standard version terminal works. If the quality of the received signal (for example an instantaneous value or a value processed by a filter) is higher than a threshold value meeting specific quality of service requirements (for example, signal to noise ratio or signal to interference plus noise ratio is equal to 0 dB), as shown in FIG. 5, if the second standard version terminal exists within the coverage area of the base station working in the first standard version mode, the quality of the uplink signal measured at the carrier frequency f1 under which the second standard version terminal works (the base station works at a carrier frequency f2, or the downlink of the base station works at a carrier frequency f2, and the uplink thereof works at a carrier frequency f3) and sent by the second standard version terminal is higher than the specific threshold value.

In an example embodiment, the base station scans an uplink signal sent by the terminal at a carrier frequency under which the first standard version terminal works. If the quality of the received signal (for example an instantaneous value or a value processed by a filter) is lower than a threshold value meeting specific quality of service requirements (for example, signal to noise ratio or signal to interference plus noise ratio is equal to 0 dB), as shown in FIG. 5, if the first standard version terminal does not exist within the coverage area of the base station working in the first standard version mode, the quality of the uplink signal measured at the carrier frequency f1 under which the first standard version terminal works (the base station works at a carrier frequency f2, or the downlink of the base station works at a carrier frequency f2, and the uplink thereof works at a carrier frequency f3) and sent by the first standard version terminal is lower than the specific threshold value, then the base station is switched to the second standard version mode or the third standard version mode.

Embodiment 5

In a communication system, the base station works in the first standard version mode, and decides whether to be adjusted to the second standard version mode or the third standard version mode according to information (i.e., network information) provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Figure 6:
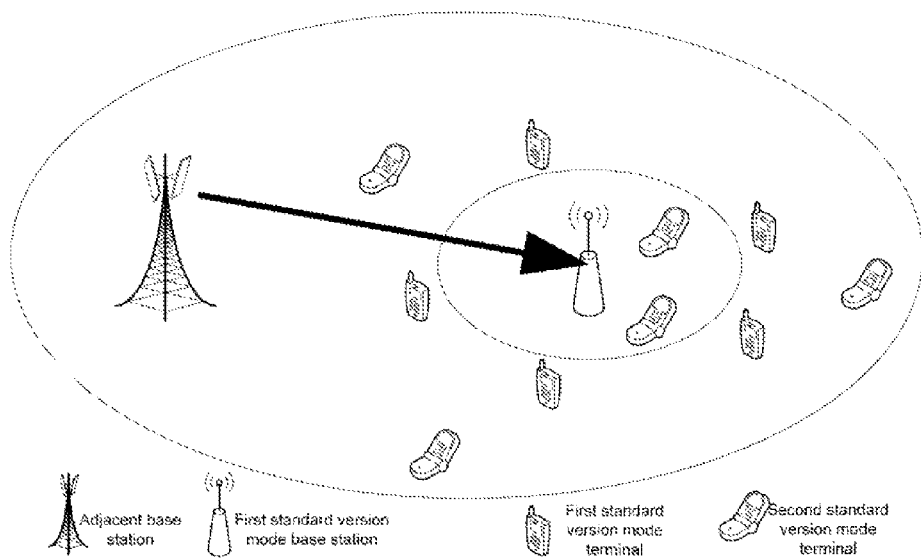
FIG. 6 is a schematic diagram of a network environment of Embodiment 5 to Embodiment 6 of the disclosure.

Other network elements (for example, network elements of access networks of other base stations and terminals or network elements of core networks such as mobility management entity) of the communication system notify the base station of the second standard version terminal existing in the vicinity thereof. As shown in FIG. 6, if the adjacent base stations notify the base station of the second standard version terminal existing in the vicinity thereof, the base station is switched to the second standard version mode or the third standard version mode. In an example embodiment, the second standard version terminal is the second standard version terminal meeting the specific user class, for example a VIP user defined by the operator itself.

Embodiment 6

In a communication system, the base station works in the first standard version mode, and decides whether to be adjusted to the second standard version mode or the third standard version mode according to information provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Other network elements (for example, network elements of access networks of other base stations and terminals or network elements of core networks such as mobility management entity) of the communication system notify the base station of information of the number of the second standard version terminal existing in the vicinity thereof. As shown in FIG. 6, if the adjacent base stations notify the base station of two second standard version terminals existing in the vicinity thereof, the base station compares the current loads thereof according to the number information. If it is concluded that switching to the second standard version mode or the third standard version mode can bring greater gains or better user experience (for example, when the base station is light-loaded and the number information reflects that there are many second standard version terminals in the vicinity of the base station, as another example when the user class of the first standard version terminal is low under the base station), the base station is switched to the second standard version mode or the third standard version mode. In an example embodiment, the second standard version terminal is the second standard version terminal meeting the specific user class, for example a VIP user defined by the operator itself.

Embodiment 7

In a communication system, the base station works in the first standard version mode, and decides whether to be adjusted to the second standard version mode or the third standard version mode according to information (i.e., network information) provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards).

The third standard version mode is a mode of providing services for the first standard version terminal and the second standard version terminal, which is a compatible mode.

If the base station notifies the second standard version terminal existing in the vicinity thereof, the base station is adjusted to the second standard version mode or the third standard version mode. In an example embodiment, the second standard version terminal is the second standard version terminal meeting the specific user class, for example a VIP user defined by the operator itself.

Embodiment 8

In a communication system, the base station works in the first standard version mode, and decides whether to be adjusted to the second standard version mode or the third standard version mode according to information provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Other network elements (for example, network elements of access networks of other base stations and terminals or network elements of core networks such as mobility management entity) of the communication system notify that the base station is adjusted to the second standard version mode or the third standard version mode, the base station is switched to the second standard version mode or the third standard version mode.

Embodiment 9

In a communication system, the base station works in the first standard version mode, and decides whether to be adjusted to the second standard version mode or the third standard version mode according to information (i.e., network information) provided by other communication nodes of the communication system. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Figure 7:
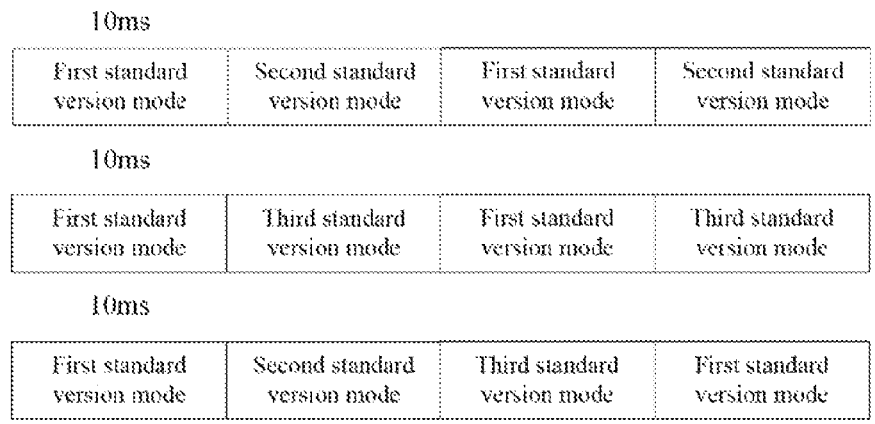
FIG. 7 is a schematic diagram showing that a base station is switched between standard versions according to Embodiment 9 of the disclosure.

Other network elements (for example, network elements of access networks of other base stations and terminals or network elements of core networks such as mobility management entity) of the communication system notify that the cycle information that the base station works in the first standard version mode and in the second standard version mode, or the cycle information that the base station works in the first standard version mode and in the third standard version mode, or the cycle information that the base station works in the first standard version mode, in the second standard version mode and in the third standard version mode, and the base station is switched between the standard versions as required. As shown in FIG. 7, the information requires that the base station should be switched between the first standard version mode and the second standard version mode, or switched between the first standard version mode and the third standard version mode, switched between the first standard version mode, the second standard version mode and the third standard version mode every 10 seconds.

Embodiment 10

In a communication system, the base station working in the first standard version mode decides to be adjusted to the second standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards).

Figure 8:
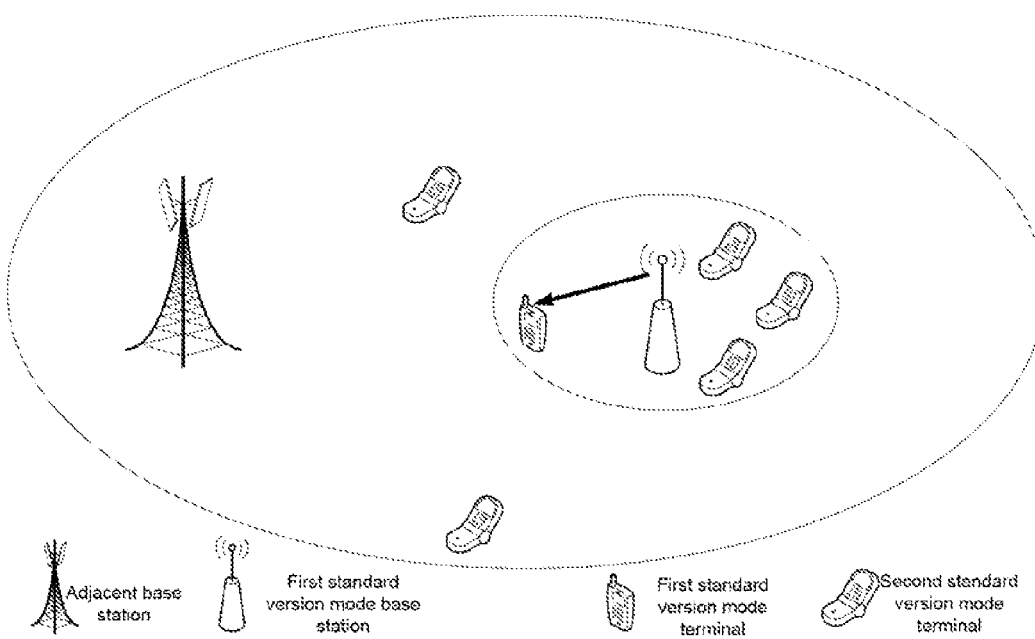
FIG. 8 is a schematic diagram of a network environment of Embodiment 10 of the disclosure.

Before being adjusted to the second standard version mode, the base station notifies that the first standard version terminal under the jurisdiction thereof (the first standard version terminal that the base station is serving) is switched to the other base stations, the schematic diagram of a network environment of which is as shown in FIG. 8.

In an example embodiment, the base station notifies the first standard version terminal of parameter information of a target base station to be switched to (for example, a carrier frequency, a synchronous sequence, a bandwidth, an operative standard version mode etc.).

In an example embodiment, the base station notifies the adjacent base stations of the information of the first standard version terminal (for example, a data context, a terminal identifier etc.).

In an example embodiment, the first standard version terminal is unable to obtain services from the base station working in the second standard version mode, i.e., the first standard version terminal does not support the second standard version.

Embodiment 11

In a communication system, the base station working in the first standard version mode decides to be adjusted to the second standard version mode or the third standard version mode. The first standard version mode is a mode of providing services far the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Before being adjusted to the second standard version mode or the third standard version mode, the base station sends information that the terminal access is inhibited, and the terminal attempting to access the base station does not select the base station as an access base station after receiving the information. In an example embodiment, the terminal that the base station is serving ignores the information after receiving the information, and continues to communicate with the base station.

In an example embodiment, the base station sends the parameter information of the adjacent base stations (for example, a carrier frequency, a synchronous sequence Identifier (ID), a cell identifier, a bandwidth, an operative standard version mode etc.), and assists the terminal attempting to access the base station in accessing the adjacent base stations rapidly.

Embodiment 12

In a communication system, the base station working in the first standard version mode decides to be adjusted to the second standard version mode or the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Before being adjusted to the second standard version mode or the third standard version mode, the base station sends information that it will work in the second standard version mode or in the third standard version mode (i.e., adjustment information). In an example embodiment, the information sent by the base station at least includes time information that the base station works in the second standard version mode or in the third standard version mode, for example, the base station will be switched to the second standard version mode or the third standard version mode in x-th frame.

In an example embodiment, the terminal receiving the information sent by the base station does not select the base station as a serving base station, or attempts to access the base station again after the base station works in the second standard version mode or in the third standard version mode. In an example embodiment, the terminal that has accessed the base station and that the base station is serving ignores the information directly after receiving the information, and continues to communicate with the base station.

Embodiment 13

In a communication system, the base station working in the first standard version mode decides to be adjusted to the second standard version mode or the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Before being adjusted to the second standard version mode or the third standard version mode, the base station sends indication information indicating that it works in the second standard version mode or in the third standard version mode. The indication information has a mapping relationship with the synchronous sequence. The base station sends the corresponding synchronous sequence on the synchronous channel.

The terminal obtains the indication information from the synchronous sequence after receiving the synchronous sequence, and acquires that the base station works in the second standard version mode or in the third standard version mode.

Embodiment 14

In a communication system, the base station working in the first standard version made decides to be adjusted to the second standard version mode or the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

Before being adjusted to the second standard version mode or the third standard version mode, the base station sends indication information indicating that it works in the second standard version mode or in the third standard version mode. The indication information is carried in a physical broadcast channel or a media access control message.

The terminal, after receiving the indication information, acquires that the base station works in the second standard version mode or in the third standard version mode.

Embodiment 15

In a communication system, the base station working in the first standard version mode decides to be adjusted to the second standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards).

The base station is adjusted to the second standard version mode. If the first standard version terminal under the base station also supports the second standard version, the terminal may continue to obtain services from the base station.

The method for processing the standard version mode of the base station (corresponding to FIG. 1) on the terminal side is described in detail below in conjunction with Embodiment 1 to Embodiment 15.

Embodiment 16

In a communication system, the base station works in the first standard version mode, or in the second standard version mode or in the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

The base station sends indication information indicating the standard version mode under which it works. The indication information has a mapping relationship with the synchronous sequence. The base station sends the corresponding synchronous sequence on the synchronous channel.

The terminal obtains the indication information from the synchronous sequence after receiving the synchronous sequence, and acquires that the standard version mode under which the base station works.

Embodiment 17

In a communication system, the base station works in the first standard version mode, or in the second standard version mode or in the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards the second standard version terminal, for example a single-mode terminal or a multi-mode terminal at least supporting the LTE series standards). The third standard version mode is a mode of providing services for the first standard version terminal and the second standard version terminal, which is a compatible mode.

The base station sends indication information indicating the standard version mode under which it works, wherein the indication information is carried in a physical broadcast channel or a media access control message.

The terminal acquires that the standard version rode under which the base station works after receiving the indication information.

Embodiment 18

In a communication system, the base station works in the first standard version mode, or in the second standard version mode or in the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

The base station sends indication information indicating the standard version mode under which it works. The terminal acquires that the standard version mode under which the base station works after receiving the indication information, and decides the subsequent working behaviours. Given that the base station may work in multiple standard version modes, description is now made with respect to each standard version mode.

For example, if the base station works in the first standard version mode, the terminal works according to the first standard version, for example, acquiring channel information to common reference signal in the second standard version does not exist), available downlink resources of traffic data (subcarriers occupied by the common reference signal on a physical resource block of the second standard version do not exist, i.e., these subcarriers may be used for transmitting the downlink traffic data), the method for acquiring the physical downlink control information (decoded according to the physical downlink control information designed by the first standard version), a feedback way, and a synchronous channel or the like.

For example, if the base station works in the second standard version mode, the terminal works according to the second standard version, for example, acquiring channel information (based on a common reference signal), available downlink resources of traffic data (subcarriers occupied by the common reference signal on a physical resource block may not be used for receiving data), the method for acquiring the physical downlink control information (decoded according to the physical downlink control information designed by the second standard version), a feedback way, and a synchronous channel or the like.

Figure 9:
FIG. 9 is a schematic diagram showing that different standard versions are configured in a time division way according to Embodiment 18 of the disclosure.
Figure 10:
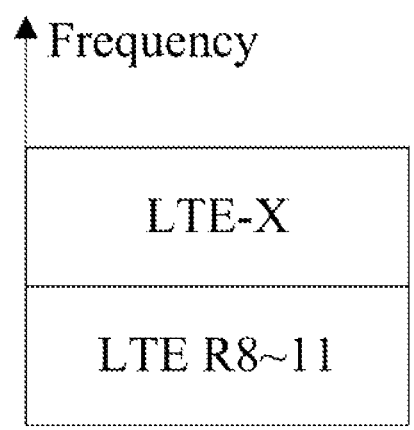
FIG. 10 is a schematic diagram showing that different standard versions are configured in a frequency division way according to Embodiment 18 of the disclosure.

For example, if the base station works in the third standard version mode (one implementation is as shown in FIG. 9 and FIG. 10, and different standard versions are configured in a time division way (corresponding to FIG. 9), or in a frequency division way (corresponding to FIG. 10), the terminal works according to the third standard version, for example, acquiring channel information, available downlink resources of traffic data, the method for acquiring the physical downlink control information, a feedback way, and a synchronous channel or the like, or works according to the first and/or the second standard version in accordance with standard default configuration or indication from the base station.

Embodiment 19

In a communication system, the base station works in the first standard version mode, or in the second standard version mode or in the third standard version mode. The first standard version mode is a mode of providing services for the terminal at least supporting the LTE-X standards (the first standard version terminal, for example a single-mode terminal or a multi-mode terminal at least supporting the LTE-X standards). The second standard version mode is a mode of providing services for the terminal at least supporting the LTE R8, or R9, or R10, or R11 standards (the second standard version terminal, for example a single-mode terminal or a multi-mode terminal at least supporting the LTE series standards). The third standard version mode is a mode of providing services for the first standard version terminal and the second standard version terminal, which is a compatible mode.

The base station sends indication information indicating the standard version mode under which it works. The terminal acquires that the standard version mode under which the base station works after receiving the indication information. If the terminal finds that the standard version thereof is unable to obtain services from the base station working in the standard version mode, the terminal searches other base stations as its own serving base station.

In an example embodiment, the base station notifies the terminal of the information of its adjacent base station (for example, a standard version mode, a synchronous sequence, a bandwidth, a carrier frequency etc.).

In the above Embodiment 1 to Embodiment 19, the first standard version is a non-backward compatible version, which has a higher spectrum efficiency than the second standard version, for example an LTE-Hotspot/Indoor (HI) enhanced standard version to be formulated. The terminal implemented based on the second standard version is unable to obtain services from the base station adopting the first standard version.

Further, in the above Embodiment 1 to Embodiment 19, the third standard version is a compatible mode (similar to the scenario where the base station adopting the LTE R10 standard may provide services for the terminal implemented based on the LTE R8 standard/the terminal implemented based on the LTE R9 standard/the terminal implemented based on the LTE R10 standard). A part of channel of the third standard version mode may be designed totally using the first standard version or the second standard version. For example, the synchronous channel and/or the physical downlink control channel sent in the third standard version mode are/is based on the second standard version. The traffic channel may be sent based on the first standard version and the second standard version according to the type of the mobile. At this time, the base station working in the third standard version mode may provide services for the first standard version terminal and the second standard version terminal. That is, both the first standard version terminal and the second standard version terminal at this time will support the compatible standard version.

It should be noted that in the above Embodiment 1 to Embodiment 19, the LTE standard is taken as an example, but other standards (for example Institute of Electrical and Electronics Engineers (IEEE) 802.13 series standards, IEEE 802.11 series standards, Code Division Multiple Access (CDMA) standards etc., or combination of standards formulated by different organizations etc.) are also applicable to the disclosure, and not repeated here.

It can be seen from the above-mentioned description that the disclosure realizes the following technical effects:

in the embodiments of the disclosure, the base station working in the first standard version mode judges whether a working mode of the base station needs to be adjusted. If the judging result is yes, the base station adjusts the first standard version mode to another standard version mode. It can be seen that the base station of the embodiments of the disclosure can adjust different types of standard version modes flexibly without adding a new version mode and without improving the terminal side, which reduces the implementation complexity of the terminal, improves the networking flexibility, improves the system spectrum efficiency effectively and feeling and experience of the user, thereby better meeting the demands of data users developing with high speed and the future development of the wireless communication industry.

Obviously, those skilled in the art should understand that each of the mentioned components or steps of the disclosure can be realized by a universal computing device; the components or steps can be focused on single computing device, or distributed on the network formed by multiple computing devices. Selectively, they can be realized by a program code which can be executed by the computing device. Thereby, the components or steps can be stored in the storage device and executed by the computing device; and under some circumstances, the shown or described steps can be executed in different orders than those described herein, or can be independently manufactured as each integrated circuit component, or multiple components or steps thereof can be manufactured to be single integrated circuit component, thus to be realized. In this way, the disclosure is not restricted to any particular hardware and software combination.

The above is only the example embodiment of the disclosure and not intended to limit the disclosure, for those skilled in the art, various changes and variations can be made to the disclosure. Any modifications, equivalent replacements, improvements and the like within the spirit and principle of the disclosure shall fall within the scope of protection as defined by the appended claims of the disclosure.

What is claimed is:

1. A method for processing a standard version mode of a base station, comprising:
   a base station working in a first standard version mode judging whether a working mode of the base station needs to be adjusted, wherein the first standard version mode is a mode of providing services for a first standard version terminal at least supporting a first standard version;
   if a judging result is that the working mode of the base station needs to be adjusted, the base station adjusting the first standard version mode to another standard version mode, wherein said another standard version mode is a mode of providing services for other standard version terminals at least supporting another standard version other than the first standard version;
   wherein said another standard version mode comprises at least one of: a second standard version mode, which is a mode of providing services for a second standard version terminal at least supporting a second standard version; and a third standard version mode, which is a mode of providing services for the first standard version terminal and the second standard version terminal;
   wherein before the base station adjusts the first standard version mode to the second standard version mode or the third standard version mode, the method further comprises: the base station sending adjustment information indicating that the base station is about to work in the second standard version mode or in the third standard version mode; and
   after the base station sends the adjustment information, the method further comprises: the base station judging whether the base station has adjusted the working mode of the base station to the second standard version mode or the third standard version mode; and when the judging result is that the base station has adjusted the working mode of the base station to the second standard version mode or the third standard version mode, the base station sending working information that the base station works in the second standard version mode or in the third standard version mode, wherein the working information is sent in any of the following ways: the base station sending the working information on a synchronous channel by selecting a synchronous sequence having a mapping relationship with the working information; and the base station sending the working information through a control signalling.

2. The method according to claim 1, wherein the base station judging whether the working mode of the base station needs to be adjusted comprises:
   the base station receiving network information provided by each communication node of a communication system, and judging whether the working mode of the base station needs to be adjusted according to the network information; or the base station judging whether the working mode of the base station needs to be adjusted according to conditions of the base station.

3. The method according to claim 2, wherein the network information comprises at least one of:
   channel quality information of the first standard version terminal, wherein the channel quality information is obtained through scanning, by the base station, a physical signal sent by the first standard version terminal;
   channel quality information of the second standard version terminal, wherein the channel quality information is obtained through scanning, by the base station, a physical signal sent by the second standard version terminal;
   equipment information about whether there exists the second standard version terminal within a coverage area of the base station;
   indication information notifying the base station to adjust to the second standard version mode or the third standard version mode; and
   information notifying the base station of a cycle that the base station works in the first standard version mode and in the second standard version mode.

4. The method according to claim 3, wherein
   the channel quality information of the first standard version terminal comprises that: a carrier frequency used for sending the physical signal by the first standard version terminal is different from a working carrier frequency of the base station; or the carrier frequency used for sending the physical signal by the first standard version terminal is the same as the working carrier frequency of the base station; and
   the channel quality information of the second standard version terminal comprises that: a carrier frequency used for sending the physical signal by the second standard version terminal is different from a working carrier frequency of the base station; or the carrier frequency used for sending the physical signal by the second standard version terminal is the same as the working carrier frequency of the base station.

5. The method according to claim 3, wherein the equipment information comprises at least one of:
   information of the number of second standard version terminals at least contained within the coverage area of the base station; and
   the second standard version terminal being a terminal meeting a specific user class.

6. The method according to claim 3, wherein
   the base station judging whether the working mode of the base station needs to be adjusted according to the network information comprises: the base station judging that the working mode of the base station needs to be adjusted when determining according to the network information that there exists a second standard version terminal within the coverage area; and
   the base station adjusting the first standard version mode to another standard version mode comprises: the base station adjusting the first standard version mode to the second standard version mode or the third standard version mode.

7. The method according to claim 6, wherein the second standard version terminal is a second standard version terminal meeting a specific user class.

8. The method according to claim 1, wherein before the base station adjusts the first standard version mode to the second standard version mode, the method further comprises: the base station sending inhibit information that the terminal access is inhibited.

9. The method according to claim 8, wherein after the base station sends the inhibit information that the terminal access is inhibited, the method further comprises: a terminal which receives the inhibit information selecting a serving base station from other base stations other than the base station.

10. The method according to claim 1, wherein
    the adjustment information comprises time information that the base station works in the second standard version mode or in the third standard version mode;
    after the base station sends the adjustment information, the method further comprises: the terminal which receives the adjustment information judging whether the base station has worked in the second standard version mode or in the third standard version mode; and when the judging result is that the base station has worked in the second standard version mode or in the third standard version mode, the terminal which receives the adjustment information attempting to access the base station.

11. The method according to claim 1, wherein when the base station is adjusted to the second standard version mode, the base station provides services for a terminal under the base station and supporting both the first standard version and the second standard version.

12. The method according to claim 1, wherein before the base station adjusts the first standard version mode to the second standard version mode, the method further comprises: the base station notifying the first standard version terminal under the base station to switch to other base stations.

13. A method for processing a standard version mode of a base station, comprising:
    a terminal receiving standard version mode information sent by a base station, wherein the base station is able to adjust the standard version mode information to another standard version mode according to a standard version mode in which the base station works currently;
    wherein said another standard version mode comprises at least one of: a second standard version mode, which is a mode of providing services for a second standard version terminal at least supporting a second standard version; and a third standard version mode, which is a mode of providing services for the first standard version terminal and the second standard version terminal;
    wherein before the base station adjusts the first standard version mode to the second standard version mode or the third standard version mode, the base station sending adjustment information indicating that the base station is about to work in the second standard version mode or in the third standard version mode; and
    after the base station sends the adjustment information, the base station judging whether the base station has adjusted the working mode of the base station to the second standard version mode or the third standard version mode; and when the judging result is that the base station has adjusted the working mode of the base station to the second standard version mode or the third standard version mode, the base station sending working information that the base station works in the second standard version mode or in the third standard version mode, wherein the working information is sent in any of the following ways: the base station sending the working information on a synchronous channel by selecting a synchronous sequence having a mapping relationship with the working information; and the base station sending the working information through a control signalling;

the terminal determining a subsequent working behaviour according to the standard version mode information.

14. The method according to claim 13, wherein the standard version mode information is sent in any of the following ways:
   the base station sending the standard version mode information on a synchronous channel by selecting a synchronous sequence having a mapping relationship with the standard version mode information; and
   the base station sending the standard version mode information through a control signalling.

15. The method according to claim 13, wherein the terminal determining the subsequent working behaviour according to the standard version mode information comprises at least one of the following:
   the terminal determining a method of acquiring channel information of the terminal according to the standard version mode information;
   the terminal determining an available downlink resource for sending service data according to the standard version mode information; and
   the terminal determining a method of acquiring physical downlink control information according to the standard version mode information.

16. A device for processing a standard version mode of a base station, comprising:
   a judgment component, configured to judge whether a working mode of the base station working in a first standard version mode needs to be adjusted, wherein the first standard version mode is a mode of providing services for a first standard version terminal at least supporting a first standard version;
   an adjustment component, configured to, if a judging result of the judgment component is that the working mode of the base station needs to be adjusted, adjust the first standard version mode to another standard version mode, wherein said another standard version mode is a mode of providing services for other standard version terminals at least supporting another standard version other than the first standard version;
   wherein said another standard version mode adjusted by the adjustment component comprises at least one of:
   a second standard version mode, which is a mode of providing services for a second standard version terminal at least supporting a second standard version; and
   a third standard version mode, which is a mode of providing services for the first standard version terminal and the second standard version terminal;
   wherein the sending component is further configured to, before the first standard version mode is adjusted to the second standard version mode or the third standard version mode, send adjustment information that the base station is about to work in the second standard version mode or in the third standard version mode;
   wherein the judgment component is further configured to judge whether the base station has adjusted the working mode of the base station to the second standard version mode or the third standard version mode; and the sending component is further configured to, when the judging result is that the base station has adjusted the working mode of the base station to the second standard version mode or the third standard version mode, send the working information that the base station works in the second standard version mode or in the third standard version mode.

17. A base station, comprising the device for processing the standard version mode of the base station according to claim 16.

* * * * *